United States Patent [19]

Hamada et al.

[11] Patent Number: 4,956,789
[45] Date of Patent: Sep. 11, 1990

[54] METHOD AND APPARATUS FOR DRIVING A SERVO SYSTEM WHILE SUPPRESSING RESIDUAL VIBRATION GENERATED DURING POSITION CONTROL

[75] Inventors: Yoosuke Hamada, Ibaraki; Hiromu Hirai, Tsukuba; Isao Kobayashi, Ibaraki, all of Japan

[73] Assignee: Hitachi, Ltd., Tokyo, Japan

[21] Appl. No.: 192,135

[22] Filed: May 10, 1988

[30] Foreign Application Priority Data

May 13, 1987 [JP] Japan ................................ 62-114656
May 13, 1987 [JP] Japan ................................ 62-114657

[51] Int. Cl.$^5$ .............................................. G05B 13/04
[52] U.S. Cl. .................................... 364/508; 364/142; 364/149; 364/565
[58] Field of Search ............... 364/508, 559, 565, 142, 364/149, 150, 474.28, 167.01, 571.07, 500, 513; 73/602, 609; 74/25; 356/375, 376; 250/492.2

[56] References Cited

U.S. PATENT DOCUMENTS

| | | | |
|---|---|---|---|
| 3,967,515 | 7/1976 | Nachtigal et al. | 364/150 |
| 4,035,762 | 7/1977 | Chamuel | 73/609 |
| 4,516,253 | 5/1985 | Novak | 250/492.2 |
| 4,528,632 | 7/1985 | Nio et al. | 364/513 |
| 4,545,249 | 10/1985 | Matay | 73/609 |
| 4,546,426 | 10/1985 | Häfner | 364/149 |
| 4,594,671 | 6/1986 | Sugimoto et al. | 364/513 |
| 4,710,865 | 12/1987 | Higomura | 364/167.01 |
| 4,734,866 | 3/1988 | Bartelt et al. | 364/513 |
| 4,815,007 | 3/1989 | Sakai et al. | 364/167.01 |

FOREIGN PATENT DOCUMENTS

127608 10/1980 Japan.
234500 11/1985 Japan.
145302 6/1987 Japan.

Primary Examiner—Gary Chin
Assistant Examiner—Ellis B. Ramirez
Attorney, Agent, or Firm—Antonelli, Terry, Stout & Kraus

[57] ABSTRACT

When a move command (data indicating to move a movable unit from one position to a target position) is issued, a movable unit is displaced in response to the move command. A target trajectory which is an aggregation of target positions varying with time is determined such that a residual vibration of a structure at and after the stop of displacement of the movable unit is minimized. Target positions at various times during the displacement of the movable unit are generated based on the target trajectory. The target positions at various times are supplied to a control unit which feeds back an actual position of the movable unit and produces a drive signal which makes a difference from the target position zero. The drive signal is supplied to an actuator so that a drive force is transmitted from the actuator to the movable unit which follows a change in the target position. As a result, the movable unit is moved to the target position and the vibration at and after the stop of movement is suppressed.

12 Claims, 11 Drawing Sheets

F I G . 11
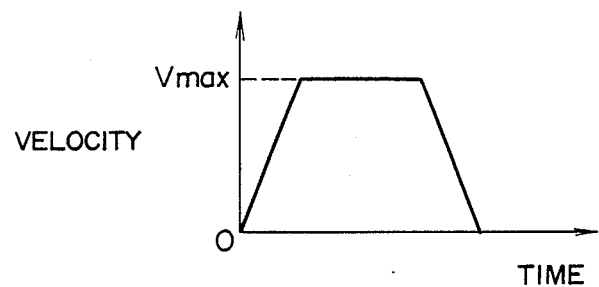
F I G . 12
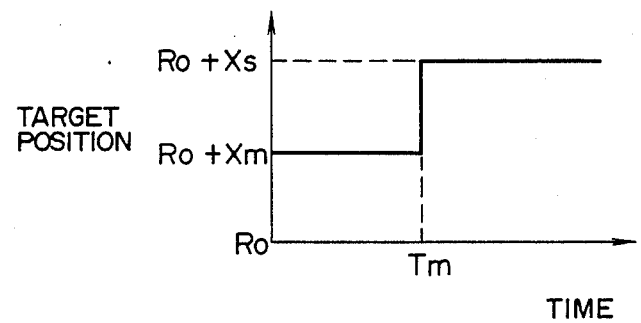
F I G . 13
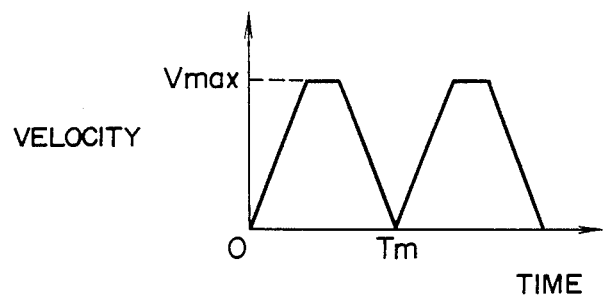

METHOD AND APPARATUS FOR DRIVING A SERVO SYSTEM WHILE SUPPRESSING RESIDUAL VIBRATION GENERATED DURING POSITION CONTROL

BACKGROUND OF THE INVENTION

1. Field of the Invention

The present invention relates to a method and apparatus for driving a servo system which positions a structure which vibrates by a reaction force of a drive force generated in a positioning operation while suppressing a residual vibration of the structure.

2. Description of the Related Art

In JP-A-60-171512, means is disclosed to suppress a structure vibration by utilizing a vibration inertia force of a load weight and using a servo mechanism. JP-A-60-231205 discloses a method for suppressing a vibration of a mechanical system without adding a separate vibration suppression device. In this method, a mechanical system in a positioning control system is modeled by an electrical circuit, the model is arranged in parallel to the control system and a signal therein is supplied to a main loop to suppress a mechanical vibration of a load.

However, in the first prior art technique, although a vibration suppression effect is attained, a separate vibration suppression device is required. As a result, the system is complex. In the second prior art technique, no separate vibration suppression device is required and the system construction is simpler, but there is no assurance that a positioning operation is attained in a short time. Further, if there is an error in the electrical circuit model of the mechanical system, the vibration suppression effect is reduced.

SUMMARY OF THE INVENTION

It is an object of the present invention to provide a method and apparatus for driving a servo system while suppressing a residual vibration generated in position control.

It is another object of the present invention to provide a method and apparatus for driving a servo system which can attain position control in a short time and reduce a residual vibration of a structure.

It is still another object of the present invention to provide a method and apparatus for driving a servo system which is simple in construction and suppresses a residual vibration generated in position control.

The above objects are achieved by the following method and apparatus.

A method for driving a servo system for determining a drive signal for an actuator for driving a movable unit in accordance with an error between a target position and a current position of the movable unit, and driving the actuator by the drive signal to displace the movable unit to a predetermined position, comprises the steps of:

in response to a move command, calculating a target trajectory for suppressing a residual vibration of a structure at an end of displacement of the movable unit by using a model of a controlled object comprising the movable unit and the structure, a constraint of the actuator and a boundary condition;

generating target positions at different times in the displacement of the movable unit based on said target trajectory; and displacing said movable unit to said predetermined position by using the generated target positions.

An apparatus for driving a servo system comprises:

a movable unit moving on or with a structure;

an actuator for imparting a drive force to said movable unit;

a control unit for producing a drive signal to said actuator to eliminate a difference between a target position and an actual position of said movable unit;

a movement detection device for detecting the actual position of said movable unit; and an operation unit including first means for calculating and storing, in response to a move command, a target trajectory for suppressing a vibration of said movable unit at or after stop of the movement based on a stored model of said movable unit and said structure, a constraint for said actuator and a boundary condition determined by the move command, and second means for generating target positions of said movable unit during the movement of said movable unit based on the stored target trajectory and supplying the target positions at various times to said control unit.

Other objects and features of the present invention will be apparent from the following description of the invention.

BRIEF DESCRIPTION OF THE DRAWINGS

FIGS. 11 to 13 show signal patterns in the embodiment of FIG. 10.

DESCRIPTION OF THE PREFERRED EMBODIMENTS

[Embodiment 1]

Figure 1:
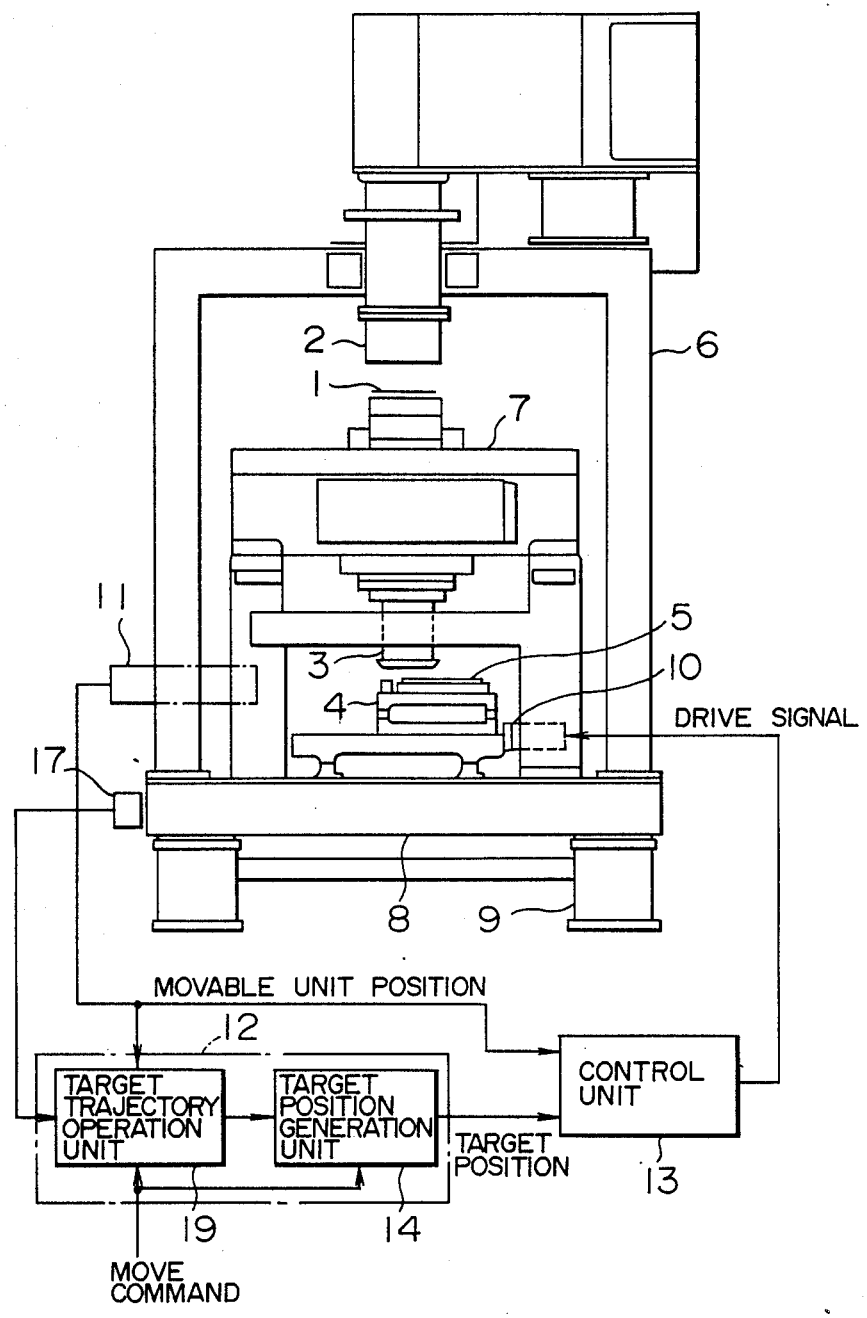
FIG. 1 shows an overall system configuration in one embodiment of the present invention.

FIG. 1 shows an embodiment in which the present invention is applied to a reduction projection exposure apparatus, which reduces a circuit pattern of LSI or IC and projects the reduced pattern onto a wafer for exposure. In FIG. 1, a reticle (circuit pattern) 1 is reduced and projected onto a wafer 5 on a movable XY stage (movable unit) 4 by an illumination system 2 and a reduction lens 3. The illumination system 2 is supported by an illumination post 6, and the reticle (circuit pattern) 1 and the reduction lens 3 are supported by a column 7. Elements of the apparatus such as the movable unit 4 are mounted on a structure base (structure) 8, and the structure 8 is held by an anti-vibration table 9 to isolate it from external vibration. Since up to several tens of circuit patterns are projected onto the wafer 5, the movable unit 4 on which the wafer 5 is mounted is moved by a step and repeat method in X and Y directions which are two orthogonal axes in a horizontal plane. The movement of the movable unit 4 and the positioning control are effected by supplying to a control unit 13 a target position supplied from an operation unit 12 and a current position of th emovable unit supplied from a movement detector 11 such as a laser range finder so that the control unit 13 produces a drive signal in accordance with a difference between the target position and the current position of the movable unit 4 to drive an actuator 10 for moving the movable unit 4. A drive force of the actuator 10 is transmitted to the structure 8 on which the apparatus is mounted, as a reaction force, so that it causes a vibration of the structure. It also vibrates the column 7 which holds the reticle 1 and the reduction lens 3 so that a relative alignment precision between the reticle 1 and the wafer 5 is lowered.

When a move command to the movable unit 4 is issued, the operation unit 12 changes the target position toward which the movable unit 4 is to be moved from the current position, with the elapsed time during the movement period so that a residual vibration of the structure 8 at the time when the movable unit 4 reaches the final goal and stops thereat. An aggregation of target positions which vary with time when the movable unit is moved from the current position to the final goal is called a target trajectory. A target trajectory which, under a given condition, can minimize a movement time for the movable unit 4 to reach the final goal and minimize a residual vibration at the time when the movable unit 4 reaches the final goal and stops thereat, is called an optimum target trajectory. The operation unit 12 may be a general purpose computer (particularly, a micro computer), but in FIG. 1 it comprises a target trajectory operation unit 19 and a target position generation unit 14 to facilitate understanding. The target trajectory operation unit 19 receives a move command and a detection signal of a vibration detection device 17 at the end of movement of the movable unit 4 to calculate the optimum target trajectory. The target position generation unit 14 stores the optimum target trajectory and supplies to the control unit 13 target positions at various time points during the movement period of the movable unit 4 in accordance with the stored optimum target trajectory. Detail of the operation of the target trajectory operation unit 19 will be explained later and only brief explanation thereof is given here. The move command which represents a movement distance from a current position to a final goal is given to the target trajectory operation unit 19 and the target position generation unit 14. When the move command is first applied, the optimum target trajectory has not been derived. The target position generation unit 14 does not then generate the target position and the target trajectory operation unit 19 determines a solution of the target trajectory which minimizes the residual vibration of the structure and minimizes the movement time of the movable unit 4 within a restricted condition for the actuator 10 and the movement detection device 11, by using a model of a system comprising the movable unit 4 and the structure 8 and by a linear programming method, and writes the target position into the memory of the target trajectory generation unit 14. Then, the target position generation unit 14 supplies the target position stored in the memory to the control unit 13 to move and position the movable unit 4. The target trajectory operation unit 19 detects, by the vibration detection device 17, the residual vibration of the structure at the end of the movement of the movable unit 4, that is, when the position of the movable unit 4 detected by the movement detection device 11 has been moved by the distance commanded by the move command. If the detected residual vibration is beyond a permitted level, the target trajectory operation unit 19 corrects a boundary condition of the linear programming method by using the residual vibration data, recalculates the target trajectory and writes it into the memory of the target position generation device 14. If the optimum target trajectory has already been calculated and stored in the memory of the target position generation unit 14, the target position generation unit 14 supplies the target position stored in the memory to the control unit 13 when the move command 19 is issued to move and position the movable unit 4. The target trajectory operation unit 19 further corrects the boundary condition based on the residual vibration data in the same manner as that described above, derives a new target trajectory and writes it into the memory of the target position generation unit 14.

Figure 2:
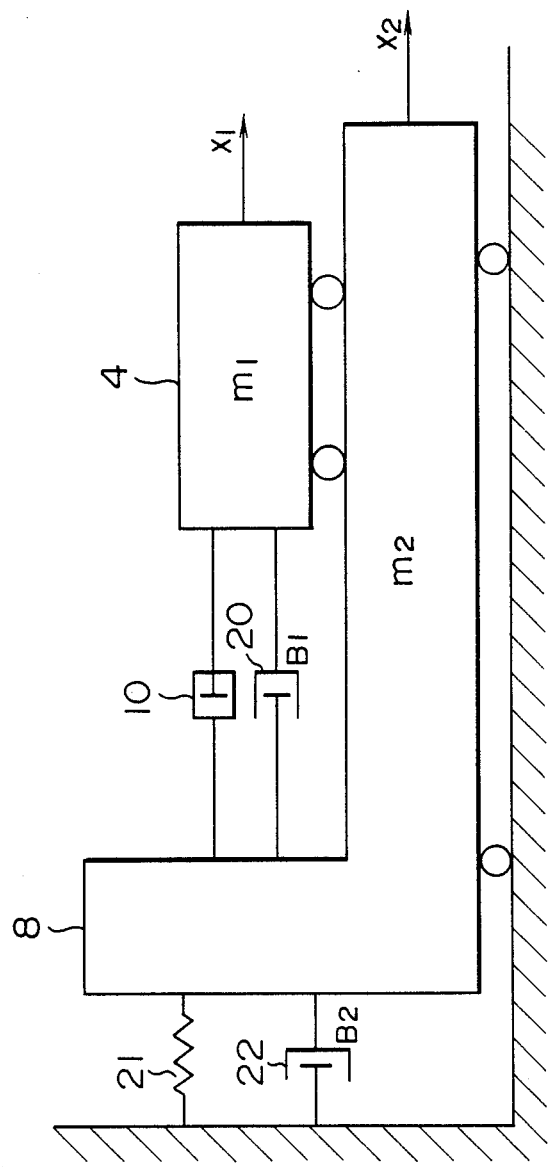
FIG. 2 shows a model of a controlled object in the embodiment of FIG. 1, FIGS. 3 and 4 are operational flow charts of the embodiment of FIG. 1.

The operation of FIG. 1 is explained with reference to a model of FIG. 2 and flow charts of FIGS. 3 and 4. FIG. 2 shows a model of a system comprising the movable unit 4 and the structure 8. In FIG. 2, the movable unit 4 is moved by a drive force u of the actuator 10 and the structure 8 receives a reaction force of the drive force u and vibrates at a vibration frequency and a damping coefficient determined by a spring 21 of the structure and a viscosity resistance 22 of the structure. Kinetic equations of the model are given by:

$$m_1 x_1 + B_1 (\dot{x}_1 - \dot{x}_2) = u \quad (1)$$

$$m_2 x_2 + B_2 \dot{x}_2 + k X_2 = -u + B_1(\dot{x}_1 - \dot{x}_2) \quad (2)$$

where $m_1$ is a mass of the movable unit 4, $m_2$ is a mass of the structure 8, $x_1$ is a position of the movable unit 4, $x_2$ is a position of the structure 8, u is a drive force of the actuator 10, $B_1$ is a damping constant of the movable unit drive system, $B_2$ is a damping constant of the structure 8, k is a spring constant of the structure 8, $\dot{X}_1$ is a velocity derived by differentiating $X_1$ once, $\ddot{X}_1$ is an acceleration/deceleration derived by differentiating $X_1$ twice, $\dot{X}_2$ is a velocity derived by differentiating $X_2$ once, and $\ddot{X}_2$ is an acceleration/ deceleration derived by differentiating $X_2$ twice.

The equations (1) and (2) are represented by a state equation as follows.

$$\dot{X} = \bar{A} X + \bar{b} u \quad (3)$$

where $$\bar{A} = \begin{bmatrix} 0 & 1 & 0 & 0 \\ 0 & -B_1/m_1 & 0 & B_1/m_1 \\ 0 & 0 & 0 & 1 \\ 0 & B_1/m_2 & -k/m_2 & (-B_2 - B_1)/m_2 \end{bmatrix}$$

$$\bar{b} = [0 \quad 1/m_1 \quad 0 \quad -1/m_2]^T$$

$$x = [x_1 \quad \dot{x}_1 \quad x_2 \quad \dot{x}_2]^T$$

An upscript T represents transposition of vectors.

A constraint required in moving the movable unit 4 by a distance $X_s$ uniquely determined by the move command while suppressing the residual vibration of the structure 8 at the end of the movement of the movable unit 4 is that the velocity $\dot{X}_1$ of the movable unit 4 is smaller than a maximum velocity $V_{max}$ that is measurable by the movement detection device and the drive force u of the actuator 10 does not exceed a maximum drive force $U_{max}$. Namely, $$|\dot{x}_1| \leq V_{max} \qquad (4)$$

$$|u| \leq U_{max} \qquad (5)$$

The movable unit 4 is stationary at time $t=0$ and has been moved by the distance $X_s$ at the end of the movable unit movement time $t=T_f$ and is stationary at that moment, and the residual vibration of the structure 8 should be zero at that moment. Accordingly, boundary conditions at an initial time $t=0$ and an end time $t=T_f$ are given by:

$$X_0 = [R_o\ 0\ 0\ 0]^T \qquad (6)$$

$$x_f = [R_0 + X_s\ 0\ 0\ 0]^T \qquad (7)$$

where $R_0$ is a target position of the movable unit in a stationary state of the movable unit prior to the movement thereof, and also the position of the movable unit, and $x_O$ and $x_f$ and state vectors x at the initial time $t=0$ and the end time $t=T_f$.

If a drive force u of the actuator which meets the constraint and boundary conditions of the equations (4) to (7) is derived, it is possible to obtain a control solution for moving the movable unit 4 by $x_s$ and stopping it thereat while suppressing the residual vibration of the structure 8. The state variable x and the drive force u are represented by an output vector y as follows.

$$y = \widetilde{C}x + \widetilde{D}u \qquad (8)$$

where $$\widetilde{C} = \begin{bmatrix} 1 & 0 & 0 & 0 \\ 0 & 1 & 0 & 0 \\ 0 & 0 & 1 & 0 \\ 0 & 0 & 0 & 1 \\ 0 & 0 & 0 & 0 \end{bmatrix}, \widetilde{D} = \begin{bmatrix} 0 \\ 0 \\ 0 \\ 0 \\ 1 \end{bmatrix}$$

The above constraint and boundary conditions are represented as follows.

$$Y_{min} \leq Y \leq Y_{max}\ (0 < t < T_1) \qquad (9)$$

$$X = X_0\ (t=0) \qquad (10)$$

$$y^{(f)}_{min} \leq Y \leq Y^{(f)}_{max}(t=T_1) \qquad (11)$$

where $Y_{min}$: possible minimum value of the output vector y $y_{max}$: possible maximum value of the output vector y
$y^{(f)}_{min}$: possible minimum value of the output vector y at the end time
$y^{(f)}_{max}$: possible maximum value of the output vector y at the end time
x : state variable vector $$y_{max} = \begin{bmatrix} +\infty \\ +V_{max} \\ +\infty \\ +\infty \\ +U_{max} \end{bmatrix}, y_{min} = \begin{bmatrix} -\infty \\ -V_{max} \\ -\infty \\ -\infty \\ -U_{max} \end{bmatrix}$$

$$y^{(f)}_{max} = \begin{bmatrix} R_0 + X_s \\ 0 \\ 0 \\ 0 \\ U_{max} \end{bmatrix}, y^{(f)}_{min} = \begin{bmatrix} R_0 + X_s \\ 0 \\ 0 \\ 0 \\ -U_{max} \end{bmatrix}$$

$$x_0 = [R_0\ 0\ 0\ 0]^T$$

Figure 3:
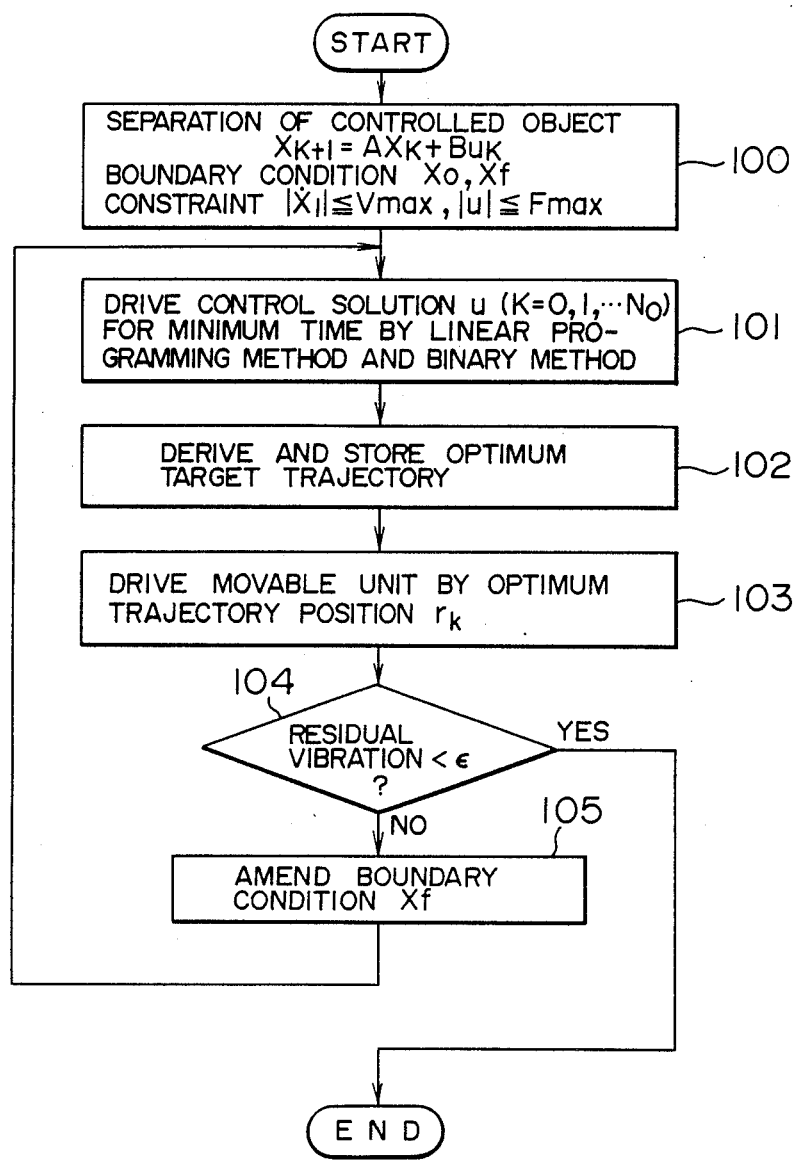
Figure 4:
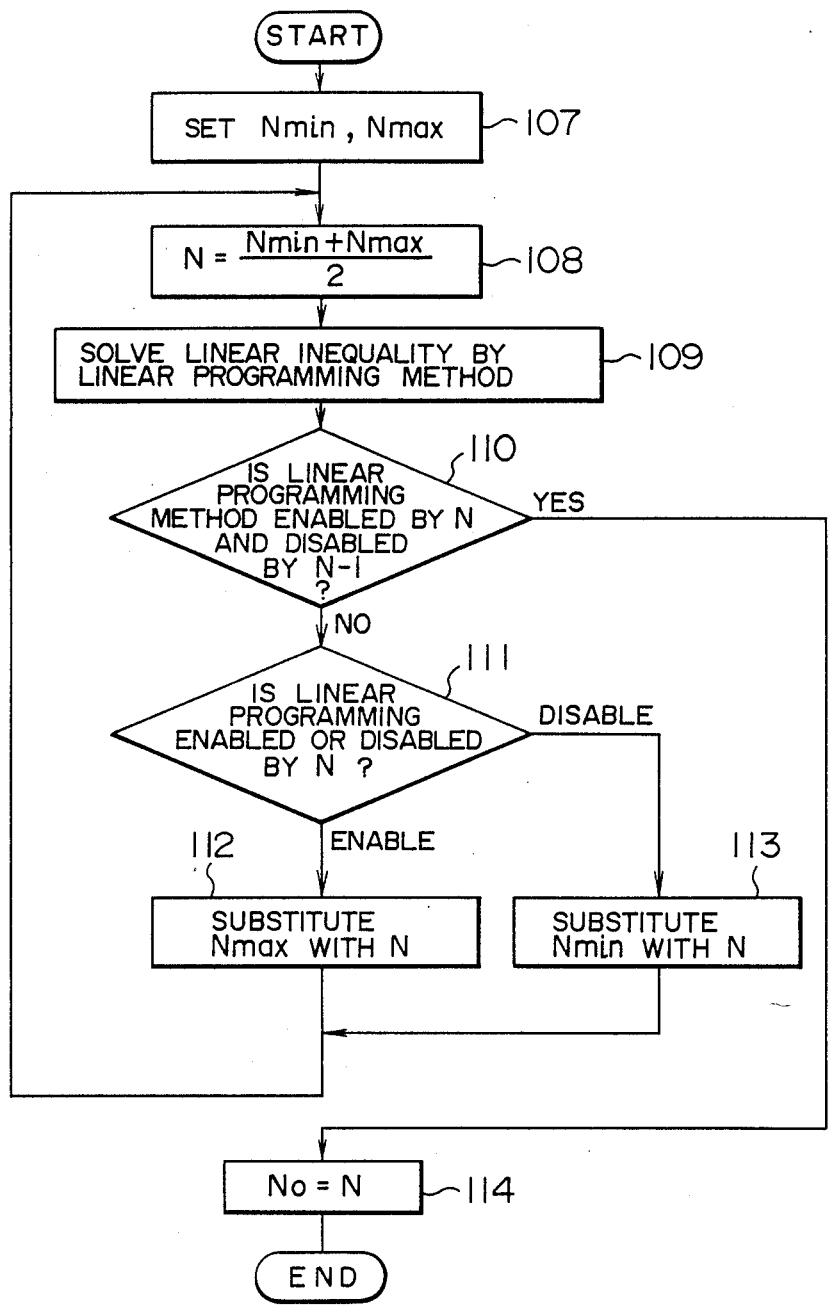

The drive force u which moves the movable unit 4 by $x_s$ step while suppressing the residual vibration of the structure 8 can be derived by a linear programming method based on the constraint and boundary condition of the formulas (9) to (11). To this end, the state equation (2) is split by a sampling period $T_s$ as follows.

$$X_{k+1} = AX_k + Bu_k \qquad (12)$$

$$Y_k = Cx_k + Du_k \qquad (13)$$

where
k: number of times of sampling
$x_{k+1}$: state variable vector at (k+1)th sampling
$x_k$: state variable sample at k-th sampling
$u_k$: drive force for the actuator at k-th sampling
$y_k$: output vector at k-th sampling
I: unit matrix $A = \exp(\widetilde{A}T_s)$, $C = \widetilde{C}$, $D = \widetilde{D}$ $B = (\exp(\widetilde{A}T_s) - I)\widetilde{A}^{-1}\widetilde{b}$ (FIG. 3 step 100)

The state vectors $x_k$ and output vectors $y_k$ at times $t = kT_s$ (k = 0, 1, 2, ...) are represented as follows.

$$x_k = A^k x_0 + \sum_{i=0}^{k-1} A^{k-1-i} B u_i \qquad (14)$$

$$y_k = CA^k x_0 + \sum_{i=0}^{k-1} CA^{k-1-i} Bu_1 + Du_k \qquad (15)$$

By applying the formulas (14) and (15) to the formulas (9), (10) and (11) and formatting them with respect to $u_i$ (i=O, N), the following linear inequalities are derived.

$$\left. \begin{aligned} y_{min} &\leq CA^k X_0 + \sum_{i=0}^{k-1} CA^{k-1-i} Bu_i + Du_k \leq y_{max} \\ (k &= 0, 1, 2, \ldots, N-1) \\ y^{(f)}_{min} &\leq CA^N X_0 + \sum_{i=0}^{N-1} CA^{N-1-i} Bu_i + Du_N \leq y^{(f)}_{max} \end{aligned} \right\} \qquad (16)$$

In solving the linear equalities (16) by the linear programming method, if N is small, it is not possible to meet the boundary condition at the time $t = T_f$ in N steps and the linear programming method is disabled. By determining $N_0$ above which the linear programming method is enabled, it is possible to obtain the drive force u as time sequence data $u_k$ (k=0, 1, 2, ...) which can move the movable unit 4 by the distance $x_s$ in a minimum time while suppressing the residual vibration of the structure. The number of steps $N_0$ for the minimum time is searched by a binary method depending on whether the linear programming method is enabled or disabled to determine control solutions $u_k$ (k=0, 1, 2, ... $N_0$) for the minimum time (FIG. 3 step 101).

Detail of the step 101 of FIG. 3 (search of the number of steps $N_0$ for the minimum time by the binary method) is explained with reference to a flow chart of FIG. 4. First, in order to search the number of steps $N_0$ for the minimum time which enables the linear programming method, by the binary method, the number of steps which disables the linear programming method is set to $N_{min}$ and the number of steps which enables the linear programming method is set to $N_{max}$ (FIG. 4 step 107). At a mid-point of the number of steps $N_{min}$ at which the linear programming method is disabled and the number of steps $N_{max}$ at which the linear programming method is enabled, that is, at a point $N=(N_{min}+N_{max})/2$, the linear inequalities (16) are derived by the linear programming method (FIG. 4 steps 108 and 109). If the linear programming method is enabled at N and disabled at $N-1$, it is the control solution for the minimum time and the operation is now terminated (FIG. 4 step 110). If the control solution for the minimum time is not obtained in the step 110, whether the solution by the linear programming method is enabled or not at N is determined (FIG. 4 step 111). If the solution by the linear programming method is enabled in the step 111, $N_{max}$ is substituted by N (FIG. 4 step 112), and if it is disabled, $N_{min}$ is substituted by N (FIG. 4 step 113). By repeating the steps 108, 109, 110, 111, 112 and 113, the search area is narrowed and it eventually reaches the number of steps $N_0$ for the minimum time so that the control solutions $u_k$ (k=1, 0, ... $N_0$) for the minimum time are obtained (FIG. 4 step 114).

Figure 5:
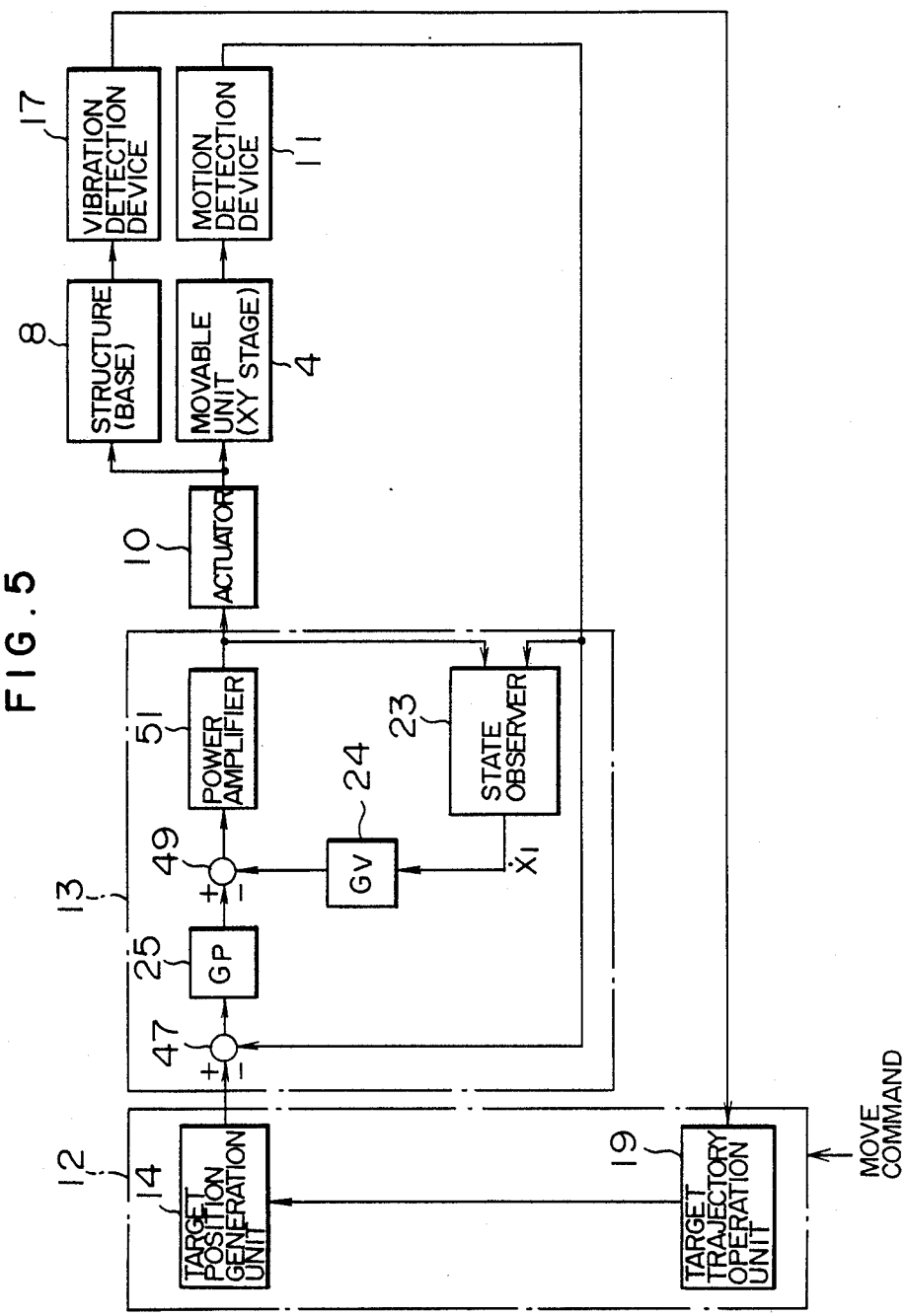
FIG. 5 shows a control block diagram of the embodiment of FIG. 1, FIGS. 6 to 9 show results of operation in the embodiment of FIG. 1.

In an actual positioning control system, it is necessary to construct a closed loop control system in order to keep the state in a steady state. As shown in FIG. 5, the closed loop control system feeds back the position $x_1$ of the movable unit 4 and the velocity $\dot{X}_1$ thereof. FIG. 5 shows a control block diagram of the embodiment of FIG. 1. In FIG. 5, an adder 47 produces an error between the target position $\gamma$ supplied from the operation unit 12 and the movable unit position $x_1$. An amplifier 25 amplifies the error by a factor of $G_p$ to produce a target velocity corresponding to the error. An adder 49 produces an error between the target velocity and the movable unit velocity $\dot{x}_1$ amplified by an amplifier 24 by a factor of $G_v$. The movable unit velocity $\dot{x}_1$ is determined by a state observer 23 based on the movable unit position $x_1$ and an output of a power amplifier 51. The output of the adder 49 (velocity error) is amplified by the power amplifier 51 and it is supplied to an actuator 10 as a drive signal. The actuator 10 is driven by the drive signal with a drive force u represented by $$u = G_a \{G_p(\gamma - x_1) - G_v \dot{x}_1\} \quad (17)$$

where
- $G_a$: gain of the amplifier 51
- $G_p$: gain of the amplifier 25
- $G_v$: gain of the amplifier 24

A control unit 13 receives the target position $\gamma$ and the movable unit position $x_1$ to produce the drive signal u represented by the formula (17).

On the other hand, the optimum target position $\gamma_k$ at each sampling point on the optimum target trajectory is derived based on the drive force $u_k$ at the sampling point derived by the linear programming method and the state $x_k$, as shown below.

$$\gamma_k = \frac{1}{G_k \cdot G_a} u_k + \left[ 1 - \frac{G_v}{G_p} \; 0 \; 0 \right] x_k \quad (18)$$

$$\text{where: } x_k = \begin{bmatrix} x_1(k) \\ \dot{x}_1(k) \\ x_2(k) \\ -\dot{x}_2(k) \end{bmatrix}$$

$x_1(k)$: $x_1$ at k—th sampling
$\dot{x}_1(k)$: $\dot{x}_1$ at k—th sampling
$x_2(k)$: $x_2$ at k—th sampling
$\dot{x}_2(k)$: $\dot{x}_2$ at k—th sampling The optimum target trajectory which is an aggregation of the optimum target positions $\gamma_k$ derived by using the linear programming method is calculated by the target trajectory operation unit 19 and stored in the memory in the target position generation unit 14 (FIG. 3 step 102). The target position generation unit 14 supplies to the control unit 13 the optimum target positions $\gamma_k$ for the respective time points from the stored optimum target trajectory at every sampling pitch so that the control unit 13 drives the actuator to position-control the movable unit 4 (FIG. 3 step 103).

Figure 6:
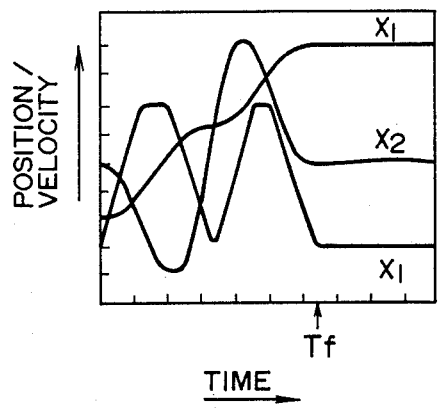

FIG. 6 shows changes in time of the movable unit position $x_1$, the movable unit velocity $\dot{x}_1$ and the structure position $x_2$ when the servo system drive apparatus calculates the optimum target trajectory to control the position. If the characteristic of the controlled object is perfectly known, it is possible to completely suppress the residual vibration of the structure at the time of stop.

Figure 7:
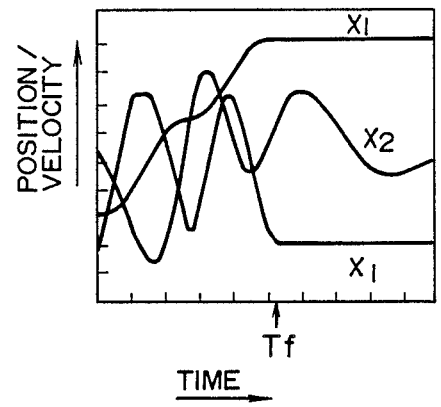
Figure 8:
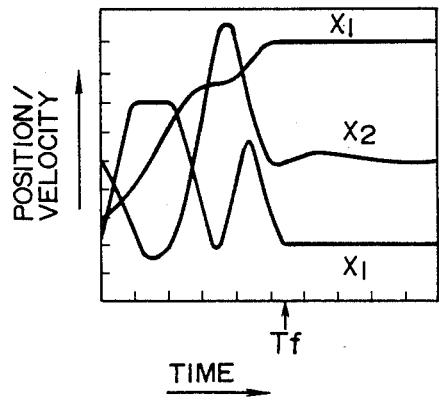
Figure 9:
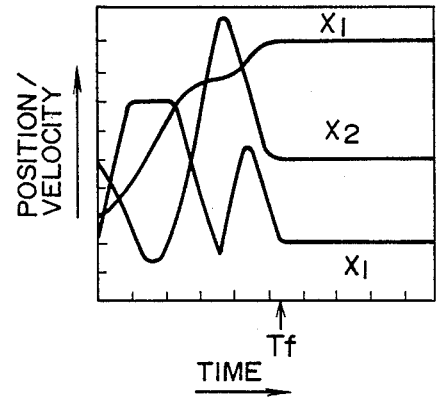

However, the optimum target trajectory derived above represents the model of the controlled object by the formulas (12) and (13), and the characteristic of the model represented by those formula is usually different from the characteristic of the actual controlled object. If there is a difference between the actual characteristic and the model characteristic, the optimum target trajectory determined by the model is not always be optimum. As a result, if the position control is done by using the optimum target trajectory determined by the calculation, the residual vibration is involved at the time of stop. If the residual vibration exceeds a permissible level $\epsilon$, it causes a trouble. Accordingly, the operation unit 12 receives the detection result of the residual vibration to determine whether it exceeds $\epsilon$. This is the step 104 of FIG. 3. If the residual vibration exceeds $\epsilon$, the target trajectory is amended. In the present embodiment, a boundary condition $x_f$ at the end of the movement of the movable unit (stop) $t = T_f$ is modified based on the residual vibration data derived when the movable unit is driven in accordance with the stored optimum target trajectory (FIG. 3 step 105). The boundary condition $x_f$ is amended in the following manner.

$$x_f = \left[ R_0 + x_s, 0 - \sum_{j=1}^{z} x^{(j)} = \sum_{j=1}^{z} \dot{x}^{(j)}_2 \right]^T \quad (19)$$

where z: number of times of iterative modification $x_2^{(j)}$ and $\dot{x}_2^{(j)}$: and velocity of the structure at the end of movement of the movable unit in the j-th modification of the boundary condition Based on the boundary condition modified by the formula (19), the optimum target trajectory is derived by the target trajectory operation unit 19 by the linear programming method, and the target trajectory stored in the target position generation unit 14 is removed. The movable unit 4 is repeatedly driven (FIG. 3 step 103) until the residual vibration becomes lower than $\epsilon$ (FIG. 3 step 104). Through such learning control, the movable unit 4 can be precisely position-controlled in a minimum time while the residual vibration of the structure 8 is suppressed, even if an identification error is included. FIGS. 7 to 9 show responses to the learning control. They show that the position control which minimizes the residual vibration in the minimum time is attained by the repetitive learning control.

[Embodiment 2]

Figure 10:
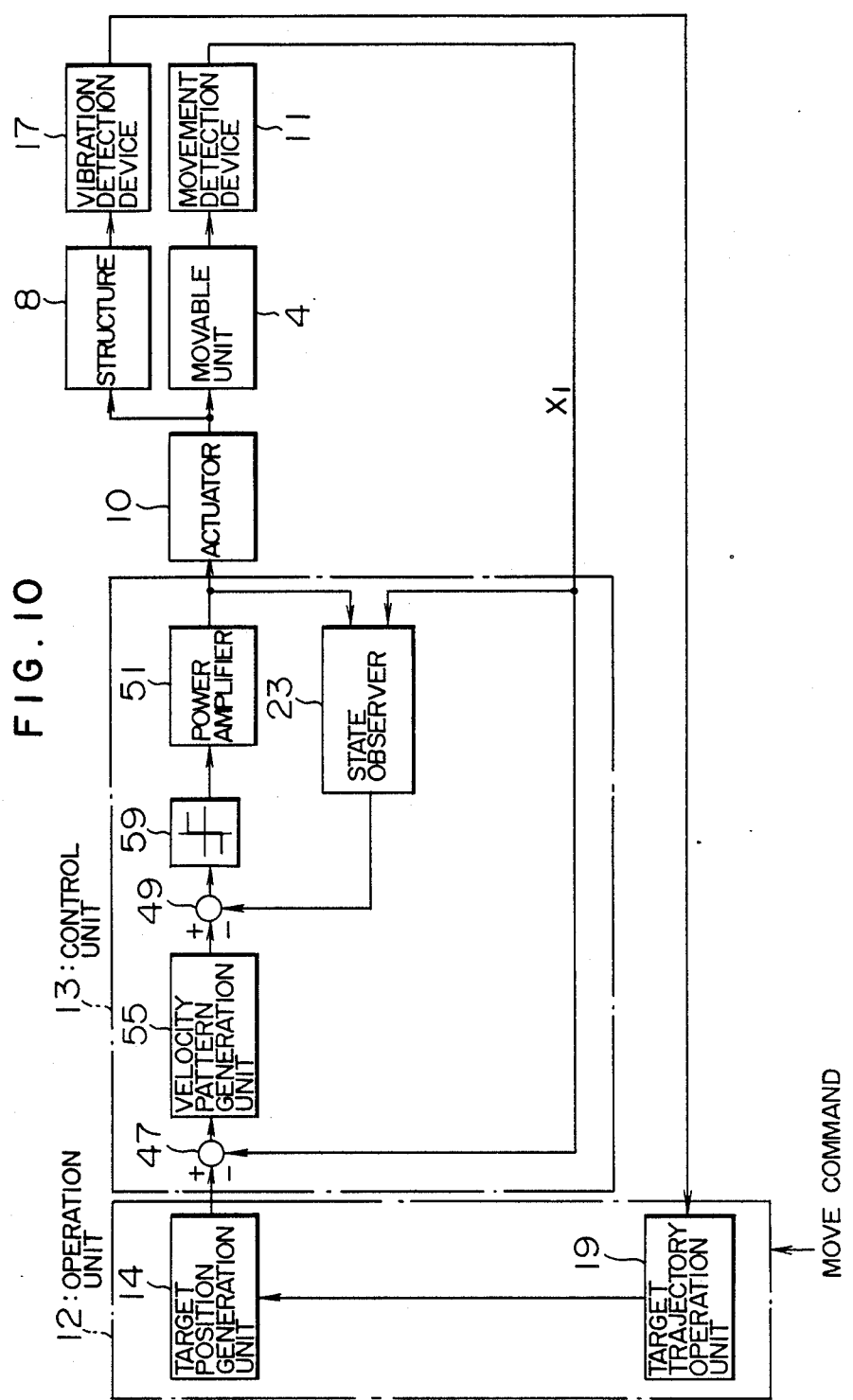
FIG. 10 shows a control block diagram in another embodiment of the present invention.

Another embodiment of the present invention is now explained. FIG. 10 shows a control block diagram of other embodiment which corresponds to FIG. 5. The overall system configuration is similar to that of FIG. 1.

In FIG. 10, most elements are identical to those of FIG. 5 and the explanation thereof is omitted. In FIG. 10, a velocity pattern generator 55 which receives an output of an adder 47 (position error) to generate a velocity pattern corresponding to the position error is provided. The velocity pattern thus produced and the velocity signal $\dot{x}_1$ are supplied to an adder 49 which produces a velocity error. This velocity error is applied to a bangbang element 59 which produces a predetermined + or − value depending on a sign (+ or −) of the velocity error. A power amplifier 51 receives this value and amplifies it by a factor of $G_a$ to produce a drive signal. The actuator 10 drives the movable unit 4 by the drive signal. In the present embodiment, the velocity pattern is accelerated to a maximum measurable speed $V_{max}$ and decelerated when it proximates the final goal as shown in FIG. 11.

A method for suppressing the residual vibration of the structure which vibrates even after the end of movement of the movable unit by a reaction force of a drive force acting on the movable unit 4. In order to move the movable unit 4 by the distance $x_s$ in the minimum time, the target position generation unit 14 generates a stepwise target position which changes from the pre-movement target position $R_0$ to the final target position $R_0 + x_s$. In order to suppress the residual vibration, the target position is divided in time into two parts as shown in FIG. 12 so that the target position is tentatively set to an intermediate target position $R_0 + X_m$, and it is switched to the final target position $R_0 + x_s$ at the time $T_m$. By generating the time-divisioned target positions, the velocity pattern of the movable unit repeats the maximum acceleration and maximum deceleration pattern twice as shown in FIG. 13. The acceleration/ deceleration patterns are adjusted such that the residual vibration generated in the structure by the first half intermediate target position $R_0 + X_m$ and the residual vibration generated by the latter half final target position $R_0 + x_s$ cancel to each other to suppress the residual vibration at the end of movement of the movable unit 4. The acceleration/deceleration patterns are represented by two parameters, the displacement $X_m$ before the intermediate target position and the switching time $T_m$, and it is important to balance those two parameters. In order to determine the parameters, a learning control method is used to repeatedly amend the target trajectory by the target trajectory operation unit 19 based on the vibration data detected by the vibration detection device 17. The learning control method is now explained.

The residual vibration of the structure 8 is first defined. The residual vibration is a vibration at the end of the movement of the movable unit 4, and it is represented by the position and velocity of the structure. The position and velocity of the structure are represented by $y_1$ and $y_2$, respectively. The displacement $X_m$ to the intermediate target position and the switching time $T_m$ are represented by $P_1$ and $P_2$, respectively. The parameters $(P_1, P_2)$ are called time division target parameters, and $(y_1, y_2)$ are called residual vibration parameters. The time division target parameters $(P_1, P_2)$ drive the movable unit 4 to cause the residual vibration $(y_1, y_2)$ in the structure 8. Thus, they have the following input/output relationship.

$$\begin{bmatrix} y_1 \\ y_2 \end{bmatrix} = \begin{bmatrix} f_1(p_1, p_2) \\ f_2(p_1, p_2) \end{bmatrix} \quad (20)$$

where $f_1$ and $f_2$ indicate that $y_1$ and $y_2$ are functions of $P_1$ and $P_2$, respectively. The input/output relationship represented by the formula (20) is approximated by the following linear equation.

$$p_{i0}^{(j)} = \sum_{K=1}^{2} a_{ik} y_k^{(j)} + b_1 \quad (i = 1, 2) \quad (21)$$

where upper script j represents the number of times of drive for learning control, and $P_{i0}$ is a deduction parameter deducted from the residual vibration data $y_k$.

By more exactly identifying the input/output relationship represented by the formula (21) in the process of the learning control, the time division target parameters which suppress the residual vibration of the structure are obtained. A method for identifying the input/output relationship and a method for deriving the parameter for suppressing the residual vibration are now explained.

The input/output relationship of the formula is identified by determining $a_{ik}$ and $b_i$ of the formula (21) such that a parameter error between the time division target parameter $p_i$ (i=1, 2) and the deduction parameter $p_{i0}$ (i=1, 2) is minimized. The following evaluation function representing the parameter error is defined.

$$J^{(j)} = \frac{1}{2} \sum_j \sum_i (p_{i0}^{(j)} - p_i^{(j)})^2 W_j \quad (22)$$

where $W_j$ is a weight factor for weighting data which includes many past errors ih the iteration of the learning control. The weight factor $W_j$ is represented by $$W_j = f_s^{j \cdot k} \quad (f_s < 1) \tag{23}$$

By placing the formula (21) in the formula (22), we get $$J^{(l)} = \frac{1}{2} \sum_j \sum_i \left( \sum_k a_{ik} y_k^{(j)} + b_i - p_i^{(j)} \right)^2 W_j \tag{24}$$

A condition which minimizes the evaluation function of the formula (24) is given by $$\frac{\partial J}{\partial b_l} = 0 \tag{25}$$

$$\frac{\partial J}{\partial a_{lm}} = 0 \tag{26}$$

By solving the formulas (25) and (26), the following relation is obtained.

$$Mq = f \tag{27}$$

where $$M = \begin{bmatrix} S_1 & 0 & S_{y1} & S_{y2} & 0 & 0 \\ 0 & S_1 & 0 & 0 & S_{y1} & S_{y2} \\ S_{y1} & 0 & S_{y1y1} & S_{y2y1} & 0 & 0 \\ S_{y2} & 0 & S_{y1y2} & S_{y2y2} & 0 & 0 \\ 0 & S_{y1} & 0 & 0 & S_{y1y1} & S_{y2y1} \\ 0 & S_{y2} & 0 & 0 & S_{y1y2} & S_{y2y2} \end{bmatrix}$$

$$q = \begin{bmatrix} b_1 \\ b_2 \\ a_{11} \\ a_{12} \\ a_{21} \\ a_{22} \end{bmatrix}, \quad f = \begin{bmatrix} S_{p1} \\ S_{p2} \\ S_{p1y1} \\ S_{p1y2} \\ S_{p2y1} \\ S_{p2y2} \end{bmatrix}$$

$$S_1 = \sum_j W_j, \quad S_{p1} = \sum_j p_i^{(j)} W_j$$

$$S_{yk} = \sum_j y_k^{(j)} W_j, \quad S_{p i y k} = \sum_j p_i^{(j)} y_k^{(j)} W_j$$

$$S_{y i y k} = \sum_j y_i^{(j)} y_k^{(j)} W_j$$

The input/output relationship represented by the formula (21) is determined as $a_{ik}$ and $b_i$ which are obtained by deriving $$q = M^{-1} f \tag{28}$$

from the formula (27).

The time division target parameter which causes the residual vibration of the structure 8 to zero is deducted by putting yk to zero in the formula (21).

$$P_{io}^{(j)} = b_i \quad (i = 1, 2) \tag{29}$$

As described above, by repetitively identifying the input/output relationship from the residual vibration data and generating the target position represented by the time division target parameter which results in zero residual vibration deducted by the formula (29), the residual vibration of the structure can be suppressed. In order to identify the input/output relationship, the input/output data of the time division target parameter and the residual vibration parameter are required. For the first learning, at least three different input/output parameters are required. Accordingly, at the first learning, the movable unit is driven by at least three different time division target parameters, and the input/output relationship is identified based on the resulting residual vibration parameter and time division target parameter.

A learning control method for determining the two parameters, the displacement $X_m$ to the intermediate target position and the switching time $T_m$ for generating the time division target position which suppresses the residual vibration of the structure 8 is explained with reference to a flow chart of FIG. 14.

For the first learning, the movable unit 4 is positioned to the three different time division target positions and the residual vibration data thereof are detected. Based on the three input/output data, the input/output relationship is identified from the formula (28), and a new time division target parameter is derived from the formula (29). The target position is stored in the memory of the target position generation unit 14. If the number of times of drive is no less than three, the learning starts from a step 121 of FIG. 14 (FIG. 14 step 120).

Figure 14:
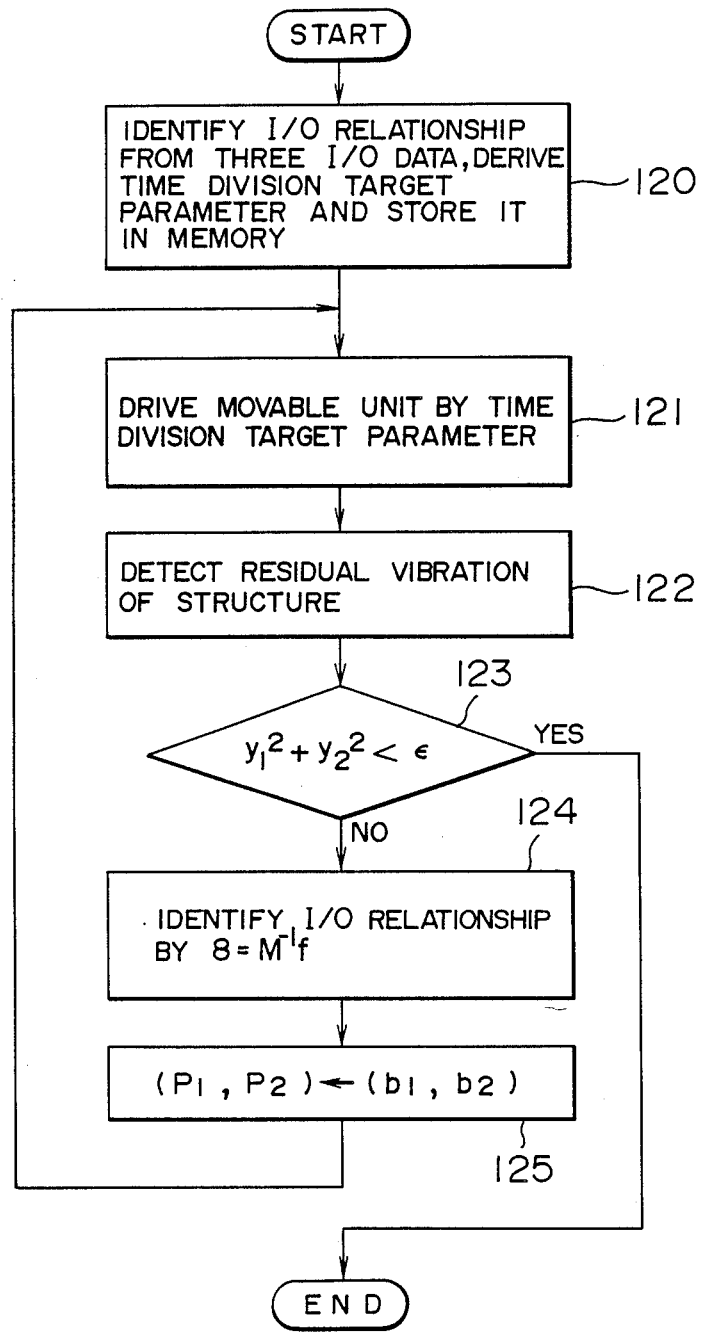
FIG. 14 shows an operational flow chart in the embodiment of FIG. 10, FIGS. 15 and 16 show results of operation in the embodiment of FIG. 10.

The time division target position represented by the displacement $X_m$ to the target position and the switching time $T_m$ is generated by the target position generating unit 14 to drive the movable unit 4 (FIG. 14 step 121).

The residual vibration generated in the structure 8 by the reaction force of the drive force acting on the movable unit 4 is detected by the vibration detection device 17 (FIG. 14 step 122).

If the detected residual vibration data is smaller than the permissible level $\epsilon$, the time division target position is fixed, and if not, the process proceeds to the next learning control step (FIG. 14 step 123).

If the residual vibration is generated, the target trajectory operation unit 19 identifies the input/ output relationship between the time division target position and the residual vibration based on the residual vibration data in accordance with the formula (28) (FIG. 14 step 124).

The target trajectory operation unit 19 determines the displacement to the intermediate target position and the switching time which are parameters for representing the time division target position which results in zero residual vibration, based on the input/output relationship determined in the step 124 (FIG. 14 step 125). The process then returns to the step 121 and repeats the above steps until the residual vibration is suppressed.

Figure 15:
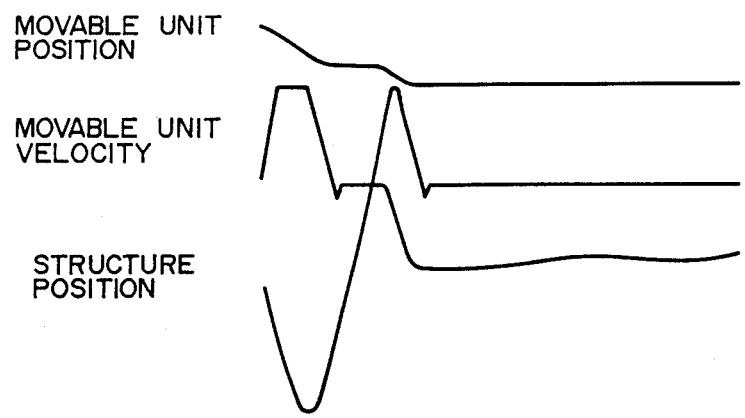
Figure 16:
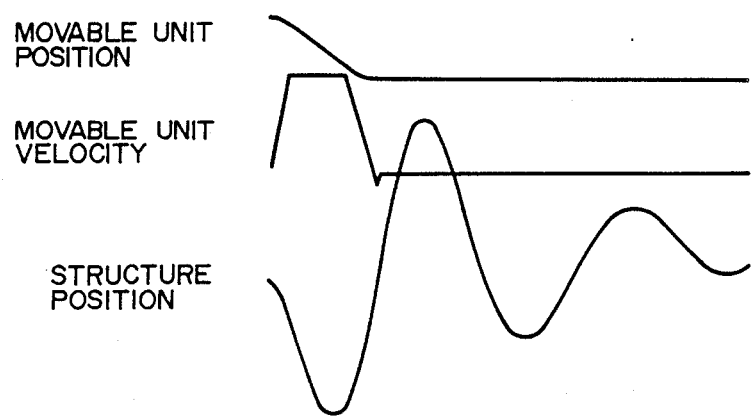

FIG. 15 shows a result when the time division target position is generated by the learning control. For comparison purpose, FIG. 16 shows a result when the movable unit is moved in a minimum time in a conventional manner. The residual vibration of the structure can be suppressed by generating the time division target position.

[Embodiment 3]

Figure 17:
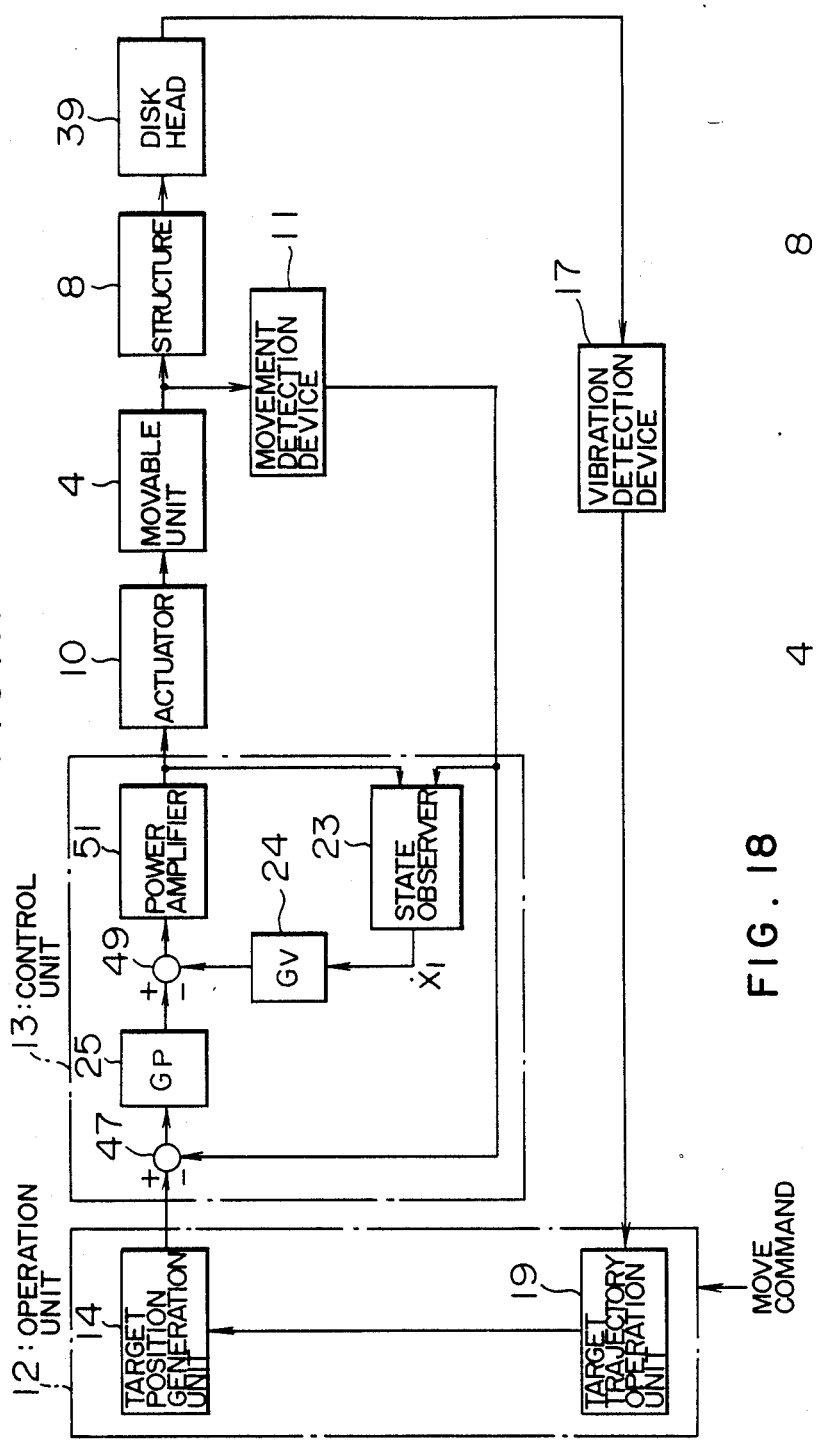
FIG. 17 shows a control block diagram in other embodiment of the present invention.

Another embodiment of the present invention is explained. FIG. 17 shows a control block diagram of the other embodiment of the present invention, and it corresponds to FIG. 5. In FIG. 17, the present invention is applied to a magnetic disk unit.

The magnetic disk unit is briefly explained first. The magnetic disk unit magnetically writes data onto a rotating disk (not shown) by a head and reads information recorded on the disk by a head. The disk has a number of recording tracks extending radially. In order to write data to a desired position or read data from a desired position, it is required that the head position is moved radially of the disk and is positioned. This is called a seek operation. In order to effect the seek operation, a servo system drive for position control is required. In this case, the residual vibration of the head position at the stop point raises a problem.

In FIG. 17, the structure 8 is a support which support a head 39. The head 39 is provided at an end of the support. A vibration detector 17 is arranged near the head mount position and detects a vibration of the structure in a vicinity of the head and supplies it to an operation unit 12. A motion detector 11 detects the position of the head and feeds it back to a control unit 13. Other components of FIG. 17 are similar to those of FIG. 5 and hence explanation thereof is omitted. The portion pertinent to the present invention is essentially identical to that of FIG. 5 and the operation thereof is similar. A difference between FIG. 5 and FIG. 17 is an object for a servo system.

Figure 18:
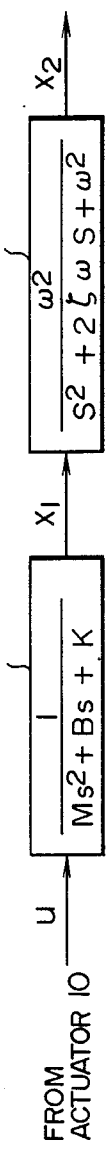
FIG. 18 shows a model of a controlled object in the embodiment of FIG. 17.

In FIG. 17, a model of the controlled object is represented by a transfer function as shown in FIG. 18. The movable unit 4 is moved by a drive force u of the actuator 10, and the structure 8 generates a vibration as the movable unit 4 moves. A model motion equation is represented as follows.

$$\begin{cases} M\ddot{x}_1 + B\dot{x}_1 + Kx_1 = u & (30) \\ \ddot{x}_2 + 2\xi\omega\dot{x}_2 + \omega^2 x_2 = \omega^2 x_1 & (31) \end{cases}$$

where M is a mass of the movable unit 4, B is a damping constant of the movable unit drive system, K is a spring constant of the movable unit drive system, $x_1$ is a position of the movable unit 4, $x_2$ is a position of the structure 8, $\omega$ is a specific angular frequency representing a vibration mode of the structure, and $\zeta$ is a damping factor of the vibration of the structure 8. The formulas (30) and (31) are represented by state equations as shown by the formula (3) described above, where $\bar{A}$, $\bar{B}$ and x in the formula (3) are given by $$\bar{A} = \begin{bmatrix} 0 & 1 & 0 & 0 \\ -\frac{K}{M} & \frac{B}{M} & 0 & 0 \\ 0 & 0 & 0 & 1 \\ \omega^2 & 0 & -\omega^2 & -2\xi\omega \end{bmatrix}$$

$$\bar{b} = \begin{bmatrix} 0 & \frac{1}{M} & 0 & 0 \end{bmatrix}^T$$

$$x = [x_1 \quad \dot{x}_1 \quad x_2 \quad \dot{x}_2]^T$$

A constraint for moving the movable unit 4 by $X_s$ from the target position $R_0$ while suppressing the residual vibration of the structure at the end of the movement of the movable unit 4 is shown by the formulas (4) and (5).

The boundary conditions at the initial time t=0 and the end time t=$T_f$ are given by $$X_0 = \begin{bmatrix} R_0 \\ 0 \\ R_0 \\ 0 \end{bmatrix} \tag{6'}$$

$$X_f = \begin{bmatrix} R_0 + X_s \\ 0 \\ R_0 + X_s \\ 0 \end{bmatrix} \tag{7'}$$

The state variable x and the drive force u are represented by the output vector y as shown by the formula (8). The constraint and the boundary condition are given by the formulas (9) to (11) where $y^{(f)}_{max}$ and $y^{(f)}_{min}$ are represented by $$y^{(f)}_{max} = \begin{bmatrix} R_0 + X_s \\ 0 \\ R_0 + X_s \\ 0 \\ u_{max} \end{bmatrix}, y^{(f)}_{min} = \begin{bmatrix} R_0 + X_s \\ 0 \\ R_0 + X_s \\ 0 \\ -u_{max} \end{bmatrix}$$

The state equation is separated by the sampling period $T_s$ as shown by the formulas (12) and (13). The state vector $x_k$ and the output vector $y_k$ at time t=$kT_s$ (k=0, 1, 2, . . .) are given by the formulas (14) and (15). By arranging them with respect to $u_i$ (i=0, 1, 2, . . . N), the linear inequalities (16) are derived.

The linear inequalities (16) are solved by the linear programming method. In order to determine the drive force which minimizes the residual vibration of the structure 8 in a minimum time, a time sequence data $u_k$ (k=0, 1, . . . $N_0$) of the drive force by the binary method are determined (FIG. 3 step 101). The search for the minimum number of steps $N_0$ by the binary method is shown in FIG. 4. The drive force u in FIG. 17 is derived from the formula (17). The optimum target position $\gamma_k$ on the optimum target trajectory is derived from the formula (18). The optimum target trajectory thus determined is stored in the memory of the operation unit 12 (FIG. 3 step 102).

Based on the target trajectory thus determined, the operation unit 12 supplies the optimum target position $\gamma_k$ to the control unit 13 (FIG. 3 step 103). The control unit 13 calculates the drive signal based on the target position $\gamma_k$ and drives the actuator 10 by the drive signal. As a result, the movable unit 4 can move the head 39 to the final goal.

If the residual vibration at the time of stop at the final goal is set lower than the permissible level $\epsilon$, the target trajectory is corrected for the next drive.

The boundary condition is amended by the following formula (FIG. 3 step 105).

$$X_f = \begin{bmatrix} R_0 + X_s \\ 0 \\ R_0 + X_s - \sum_{j=1}^{z} x_2^{(j)} \\ - \sum_{j=1}^{z} \dot{x}_2^{(j)} \end{bmatrix} \quad (19)'$$

Based on the amended boundary condition, the optimum target trajectory (aggregation of $\gamma_k$) is again calculated, and it is stored in the internal memory (FIG. 3 steps 101 and 102). For the next movement, the optimum target position $\gamma_k$ is outputted based on the newly stored optimum target trajectory (FIG. 3 step 103). The control unit 13 executes the position control. This operation is carried out for each movement of the movable unit until the residual vibration becomes lower than the permissible level $\epsilon$.

In accordance with the present invention, the movable unit can be moved and positioned without adding independent vibration suppression apparatus while suppressing the residual vibration of the structure in a minimum time. Accordingly, the apparatus is not complex. By the introduction of the learning control, the model identification error of the controlled object is compensated and the residual vibration of the structure is suppressed.

We claim:

1. A method for driving a servo system by determining a drive signal for an actuator for driving a movable unit in accordance with an error between a target position and a current position of the movable unit, and driving the actuator by the drive signal to displace the movable unit to a predetermined position, comprising the steps of:

in response to a move command, calculating a target trajectory for suppressing a residual vibration of a structure at an end of displacement of the movable unit by using a model of a controlled object comprising the movable unit and the structure, a constraint of the actuator and a boundary condition;

generating target positions at different times in the displacement of the movable unit based on said target trajectory; and displacing the movable unit to said predetermined position by using the generated target positions.

2. A method for driving a servo system according to claim 1, further comprising the steps of:

detecting the residual vibration at a time point immediately after the movable unit has been displaced to said predetermined position;

amending said target trajectory based on the detected vibration such that the residual vibration is minimized;

generating an amended target position for the next displacement of said movable unit based on the amended target trajectory; and displacing the movable unit to the amended target position.

3. A method for driving a servo system according to claim 1 wherein said target trajectory is calculated by solving a linear programming method.

4. A method for driving a servo system according to claim 1 wherein said target trajectory is a pattern that continuously varies during the displacement of the movable unit.

5. A method for driving a servo system according to claim 1 wherein said target trajectory is a pattern varying stepwise at least twice during the displacement of the movable unit.

6. A method for driving a servo system comprising the steps of:

calculating and storing, in response to a move command, a target trajectory for suppressing vibration of a controlled object having a movable unit at a time point immediately after a stop of displacement of the movable unit by using a model of the controlled object, a constraint of an actuator for driving the movable unit and a boundary condition for the displacement;

generating target positions during the displacement of the movable unit based on the target trajectory;

calculating a drive signal to eliminate a difference between a target position and a position of the movable unit detected by a displacement detection device;

driving the actuator by the drive signal to displace the movable unit to a predetermined final position determined by the move command;

detecting vibration of the controlled object at a time point immediately after the stop of the displacement, modifying the target trajectory based on the detected vibration such that a vibration immediately after the stop of displacement is minimized, and storing the modified target trajectory; and controlling the position of the movable unit in response to a subsequent move command based on the modified and stored target trajectory.

7. A method for driving a servo system according to claim 6, further comprising a step of determining if the detected vibration immediately after the stop of displacement of the movable unit exceeds a permissible level, wherein the modifying is carried out for each displacement of the movable unit until the detected vibration becomes lower than the permissible level.

8. A method for driving a servo system according to claim 6 wherein the target trajectory is a pattern that continuously varies during the displacement of the movable unit.

9. A method for driving a servo system according to claim 6 wherein the target trajectory is a pattern varying stepwise at least twice during the displacement of the movable unit.

10. An apparatus for driving a servo system comprising:

a movable unit moving on or with a structure;

an actuator for imparting a drive force to said movable unit;

a control unit for producing a drive signal for said actuator to eliminate a difference between a target position and an actual position of said movable unit;

a movement detection device for detecting the actual position of said movable unit; and an operation unit including first means for calculating and storing, in response to a move command, a target trajectory for suppressing a vibration of aid movable unit at or after stop of movement of aid movable unit based on a stored model of said movable unit and the structure, a constraint for said actuator and a boundary condition determined by the move command, and second means for generating target positions of said movable unit during movement of said movable unit based on the stored target trajectory and supplying the target positioned at various times to said control unit.

11. An apparatus for driving a servo system according to claim 10, further comprising a vibration detector for detecting vibration data corresponding to vibration of the structure, wherein said operation unit includes third means which receives the vibration data at or after the stop of movement of said movable unit, modifies the target trajectory based on the vibration data to minimize the vibration, and stores the modified target trajectory.

12. An apparatus for driving a servo system according to claim 11 wherein said third means carries out the modification only when the received vibration data is higher than a predetermined level.

* * * * *